Nov. 26, 1935.  H. E. L. OWEN  2,022,516
OPTICAL VIEWING INSTRUMENT
Filed May 18, 1934  3 Sheets-Sheet 1

INVENTOR
Henry E. L. Owen
BY Townsend & Decker
ATTORNEYS.

Nov. 26, 1935.  H. E. L. OWEN  2,022,516
OPTICAL VIEWING INSTRUMENT
Filed May 18, 1934  3 Sheets-Sheet 2
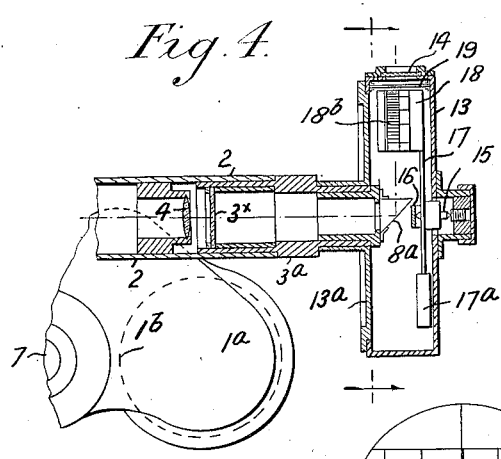
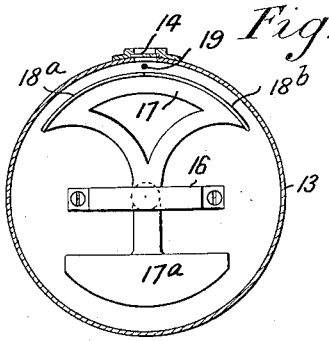
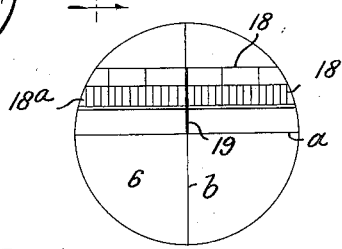
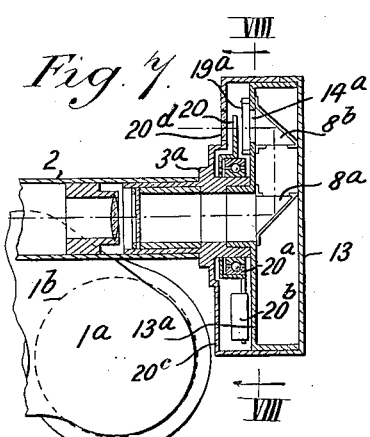
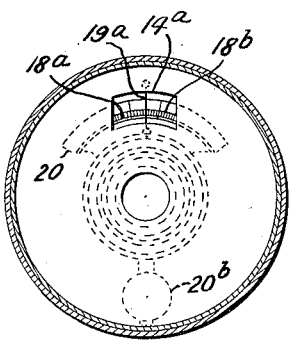
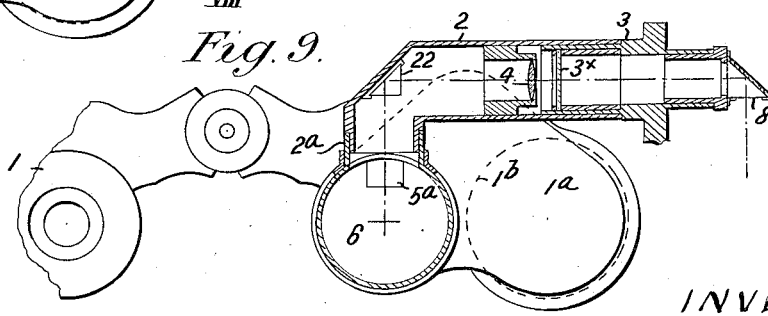
INVENTOR
Henry E. L. Owen
BY Townsend & Decker
ATTORNEYS.

Nov. 26, 1935.  H. E. L. OWEN  2,022,516
OPTICAL VIEWING INSTRUMENT
Filed May 18, 1934   3 Sheets-Sheet 3

INVENTOR
Henry E. L. Owen
BY Townsend & Decker ATTORNEYS.

Patented Nov. 26, 1935

2,022,516

UNITED STATES PATENT OFFICE 2,022,516

OPTICAL VIEWING INSTRUMENT

Henry Ernest Lloyd Owen, West Kensington, England

Application May 18, 1934, Serial No. 726,219
In Great Britain May 23, 1933

13 Claims. (Cl. 88—2.2)

This invention relates to means for determining in conjunction with an optical viewing instrument such as a binocular, monocular, or other telescope provided with an image plane, graticule or viewing window (hereinafter called the image plane) arranged in front of each of the magnifying eye pieces, in the case of a binocular or in front of the single magnifying eye piece, in the case of a monocular or an ordinary telescope, and a periscope arrangement, the magnetic bearing, or the elevation or depression, or the magnetic bearing and elevation or depression of a distant object, and it has for its object to provide improved means for this purpose, whereby inter alia images of the degrees of a compass, or of a clinometer, or of both a compass and a clinometer, can be read off easily and accurately on the image plane or planes of a viewing instrument of the kind referred to, on which a view of the distant object can simultaneously be seen through the object glasses or glass of the instrument.

For this purpose, an optical viewing instrument of the kind referred to, constructed according to the present invention, is provided with a tubular support that is mounted to rotate about a horizontal axis at right angles to the length of the instrument and carried by a hollow bearing fixed to the instrument, and is adapted in conjunction with one or more prisms or mirrors (hereinafter referred to as a prism or prisms) within the instrument, to form a portion of the periscope arrangement of the instrument, the remaining portion of the periscope arrangement being formed by a prism arrangement carried by a portion of the tubular support outside the instrument and adapted for use with a magnetic compass carried by the tubular support, in the case where the instrument is to be used for determining the magnetic bearing of a distant object being sighted through the object glass, or one of the object glasses of the instrument, or for use with a clinometer carried by the said tubular support, when the instrument is to be used for determining the elevation or depression of an object being sighted through the instrument.

Figure 1:
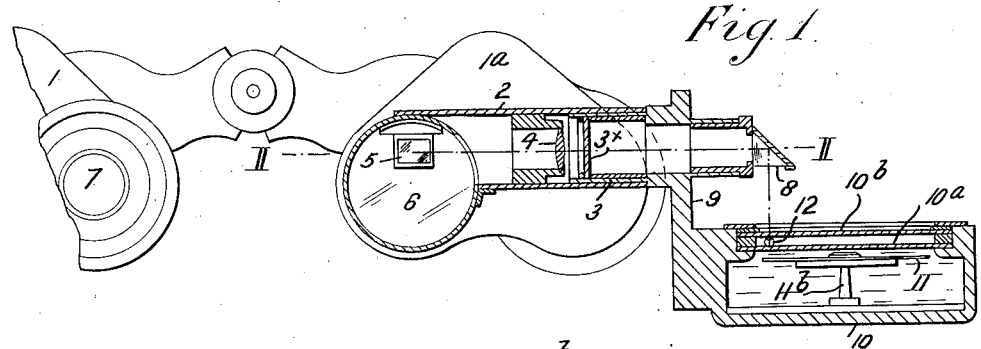
Figure 2:
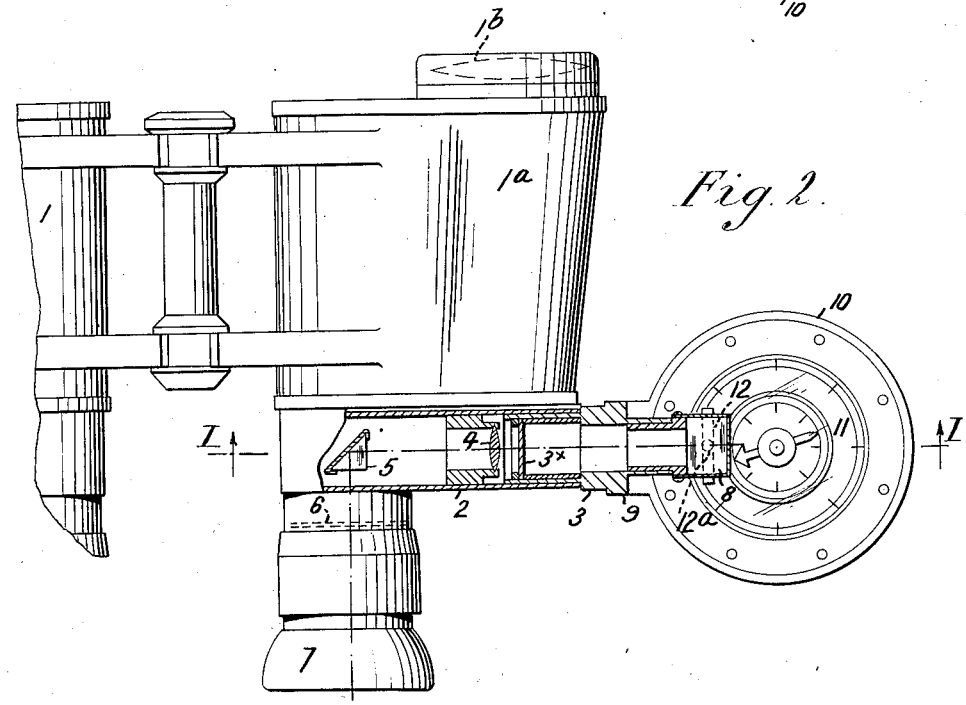
Figure 3:
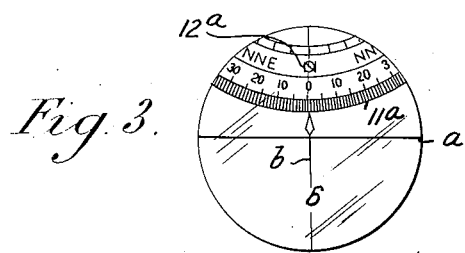
Figure 10:
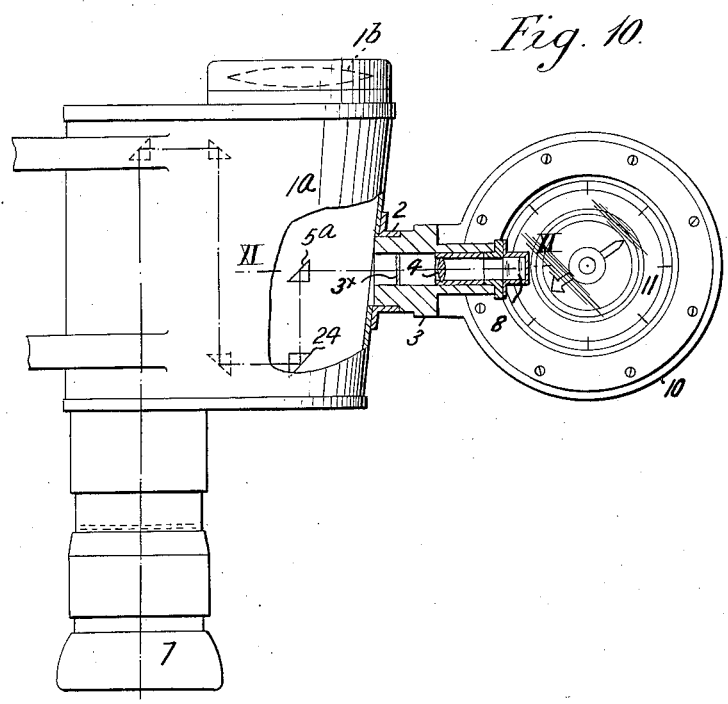

In the accompanying illustrative drawings, Fig. 1 shows partly in rear end elevation and partly in vertical section on the line I—I of Fig. 2, and Fig. 2 partly in plan and partly in horizontal section on line II—II of Fig. 1, a binocular telescope adapted, according to the invention, to determine the magnetic bearing of a distant object that is being viewed simultaneously through the object glass of the instrument. Fig. 3 is an enlarged detail view. Figs. 4 and 5 are similar views to Figs. 1 and 2 showing the instrument adapted, according to the invention, to determine the elevation or depression of a distant object that is being viewed simultaneously through the instrument. Fig. 6 is an enlarged detail view. Fig. 7 is a similar view to Fig. 1 and Fig. 8 is a section on the line VIII—VIII of Fig. 7, showing a modified form of clinometer. Fig. 9 shows partly in end elevation and partly in cross section, another modified construction. Fig. 10 shows partly in plan and partly in horizontal section, and Fig. 11 partly in end elevation and partly in vertical section on line XI—XI of Fig. 10, a further modification. Fig. 12 shows in rear end elevation, a binocular provided with a magnetic compass and with a clinometer.

In the example shown in Figs. 1 and 2, to the rear end of one of the members 1 and 1ª, namely the member 1ª, of a binocular telescope, is secured a horizontal tubular bearing 2, conveniently of square section, in which a tubular support 3 is mounted to rotate firmly about a horizontal axis and adapted to form, in conjunction with a focussing lens arrangement 4 within the tubular bearing 2 and an erecting prism 5 arranged within the instrument in front of the image plane 6 and the magnifying eye piece 7 of the instrument, part of a periscopic arrangement the remaining portion of which is constituted by a prism 8 carried by the outer end of the tubular support 3. The tubular support 3 is provided outside the tubular bearing 2 and at the inner side of the prism 8, with a vertical carrier 9 in the form of a depending plate which, in this example, carries a magnetic compass box 10. The compass box is so arranged that a segment of the compass card 11 therein, bearing the degrees of the compass, is directly below the prism 8 which is arranged to reflect an image of the said segment through the tubular support 3, tubular bearing 2 and focussing lens arrangement 4 on to the reflecting surface of the erecting prism 5. The arrangement is such that when the compass box is held horizontally, a focussed image of the said segment of the compass card can be viewed on the image plane 6 through the magnifying eye piece 7 simultaneously with an image of a distant object as viewed through the object glass 1ᵇ carried by the said member 1ª of the instrument, and the magnetic bearing or azimuth of the distant object be determined. By the construction described, the magnified image of the segment of the compass card will appear to extend transversely across the image plane 6, as shown at 11ª in Fig. 3, with the degrees and letters on the segment, upright as shown, so that they appear exactly as they appear on the compass card and can therefore be read off easily and quickly. By arranging the tubular bearing 2, tubular support 3 and prisms 5 and 8 above the axis of the eye piece 7, as shown in Fig. 1, the image 11a of the said segment will appear above the central horizontal index line a of the image plane, as shown in Fig. 3, which is practically found to be the more convenient position. It could however be arranged to appear below the said index line a by arranging the said parts 2, 3, 5 and 8 below the axis of the eye piece 7. The tubular support 3 may be provided with a clear glass window 3x to exclude dust and moisture from the prism 8.

The compass is preferably of the liquid type in which a glass cover 10a is arranged directly above the pivoted compass card 11 and the liquid within the box 10.

If, when in use, the viewing instrument is turned upward or downward to view a distant object and the rotary tubular support 3 and compass box 10 are turned therewith, the tubular support and compass box must be turned in the bearing 2 to bring the compass box and compass card back to the horizontal position, before reading off the magnetic bearing of the object. This, for ordinary practical purposes, can be done by turning the compass box until the compass card 11 is out of contact with the glass cover 10a and can swing freely on its pivot 11b. Or, for a like purpose, and for obtaining greater accuracy, there may be arranged beween the glass cover 10a and another glass cover 10b fixed a short distance above, and below the prism 8, a liquid level 12, an image of the air bubble of which will be reflected by the prism 8 together with that of the adjacent segment of the degrees of the compass card 11, into and through the periscope arrangement and be seen on the image plane 6 of the instrument, the arrangement being such that when the compass box is truly horizontal, the image of the air bubble of the level will be seen on the vertical index or reference line b of the image plane, as shown at 12a in Fig. 3, if the segmental image 11a of the compass card intersects the vertical index line b on the image plane as shown.

An ordinary portable azimuth or prismatic compass can readily be adapted to serve the purpose of the compass with prism and rotary tubular support, hereinbefore described, by removing therefrom those parts thereof not necessary for the present invention and securing it to the aforesaid vertical carrier 9.

When the viewing instrument is to be used for determining the elevation or depression of a distant object, the tubular support 3 with prism 8, carrier 9 and compass box 10 is withdrawn from the tubular bearing 2 and replaced by another tubular support with prism and carrier on which the clinometer is mounted, the prism being arranged to reflect images of the segmental scales of inclination and depression and of a movable index or pointer associated with the clinometer, through the tubular support and its bearing and focussing lens to form a focussed image thereof on the image plane of the instrument. In the example shown in Figs. 4 and 5. the clinometer comprises a circular box 13 of opaque material, for example metal, arranged with its axis horizontal. The inner side wall 13a of the box forms a carrier fixed to a tubular support 3a provided with a prism 8a and inserted in the bearing 2. The upper portion of the box is provided with a transparent window 14 arranged directly above the prism 8a. Within the box and to the centre of its outer side wall, is pivoted, as by a horizontal pivot pin 15 journalled at one end in the said outer side wall and at its other end in a bracket 16 fixed to the said wall, a vertical plate 17 provided at its upper end with an overhanging circular segment 18 of transparent material, for instance mica or celluloid, that is arranged opposite and below the window 14. The segment 18 is provided on its upper side at 18a, 18b with two segmental scales of degrees extending in opposite directions from a central zero indication, that is arranged at the uppermost portion of the segment 18, one scale representing degrees of elevation, and the other degrees of depression. The pivoted plate 17 is weighted at its lower end at 17a so that it will always remain in the same position. Fixed within the box 13 and extending longitudinally thereof and opposite the window 14, is an index wire 19 arranged across and near to the segment 18 and normally opposite the zero indicator between the two segmental scales referred to, so that when the viewing instrument is held horizontally, an image of the index wire 19 and the zero indication and adjacent portions of the two scales will be reflected by the prism 8a through the remaining portion of the periscope arrangement and be focussed on the image plane 30 of the instrument. When the instrument is turned upward or downward to determine the elevation or depression of a distant object, the magnetic bearing of which may have previously been determined, as hereinbefore described, the index wire 19 will be moved by the turning of the instrument over one or other of the scales 18a or 18b of degrees on the segment 18 representing the elevation or depression of the distant object, and an image of the index wire and of the portion of the particular scale opposite the index wire, will be focussed on the image plane 6 of the instrument and can be read off through the magnifying eye piece 7, simultaneously with an image of the object as viewed directly through the object glass 1b of the instrument. The index wire and the said portion of the scale, will be illuminated by light passing through the window 14. With the prisms 8a and 5 arranged as shown, the focussed image of the scales will appear to extend horizontally across the upper portion of the image plane 6 with the degrees thereof and the image of the index wire 19, extending in a vertical direction as shown in Fig. 6. The particular numbered degree on the scale opposite which the index wire appears when the instrument is turned upward or downward, will represent the angle of elevation or depression, as the case may be, of the object and can easily and quickly be read off on the image plane.

In the modified construction shown in Figs. 7 and 8, the clinometer comprises two segmental scales 18a, 18b of degrees of elevation or depression extending in opposite directions from a zero indication between them and which will be at the top, the scales and zero indication being arranged on a vertical plate 20 mounted on a bearing 20a, for instance a ball bearing, on the tubular support 3a and adjacent to the side wall 13a of the clinometer box 13 which is fixed to the said tubular support 3a. The plate 20 is weighted at its lower end at 20b, so that it will remain stationary when the viewing instrument 1, 1a with tubular support 3a and clinometer box 13, is turned about a horizontal axis to determine the elevation or depression of a distant object. The pointer or index associated with the said scales may, as shown, be in the form of a wire 19ª arranged in front of the said scales, and fixed to wall 13ª of the box 13 opposite a vertical window 14ª therein. The window is opposite the scales and the index wire is arranged to be vertical and opposite the zero indication between the scales, when the instrument is held horizontally. The plate 20 may be protected by a cover 20ᶜ movable with the box 13 and provided with a window 20ᵈ opposite to the scales 18ª, 18ᵇ which are formed on a transparent segment of the plate 20, and be illuminated by light passing through the said window 20ᵈ. The part of the periscope arrangement associated with the clinometer and carried by the tubular support 3ª, in this example, a double reflecting prismatic arrangement comprising an upper prism 8ᵇ arranged to receive an image of portions of the clinometer scales 18ª, 18ᵇ and intermediate zero indicator and of the index or pointer 19ª and reflect such images downward on to the lower reflecting portion of a prism 8ª from which they will be reflected through the tubular support 3ª, the tubular bearing 2 and focussing lens arrangement 4 on to the prism 5 (Fig. 1) so that the said images will be focussed on the said image plane. This modified construction of clinometer works in the same manner as that hereinbefore described with reference to Figs. 4 and 5, and the focussed images of the scales or scale and index wire will appear on the image plane, as shown in Fig. 6, extending horizontally and intersecting the vertical index line b and above the index line a on that plane. They could however, if desired, be arranged to extend horizontally below the index line a, as hereinbefore explained with reference to the image of the segment of a compass card.

By suitably modifying the portion of the periscope arrangement within the instrument, the image of the segment of the compass card, or the images of the clinometer scales and index wire could be arranged to appear to one side of the vertical index line b on the image plane and intersect the horizontal index line a thereof, but the arrangements shown are preferred.

The portion of the periscopic arrangement within the optical viewing instrument instead of being constructed and arranged as hereinbefore described, may be constructed and arranged in other ways. For instance, as shown in Fig. 9, it may comprise two tubes or passages, for instance a horizontal tube 2 in the outer end portion of which the aforesaid tubular support 3 is mounted to turn about a horizontal axis, and a vertical tube 2ª, a prism 22 being arranged at the junction of the two tubes to receive the image or images reflected from the portion of the periscope arrangement outside the instrument and to reflect it or them downward, and a lower prism 5ª arranged to receive the said image or images and reflect them on to the image plane of the instrument, one of the tubes being provided with a focussing lens arrangement 4 for the purpose hereinbefore described.

Figure 11:
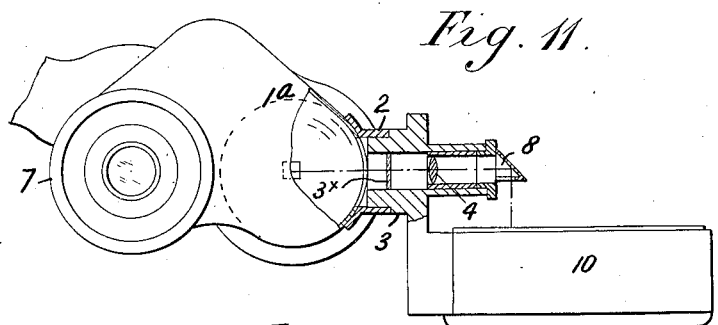
Figure 12:
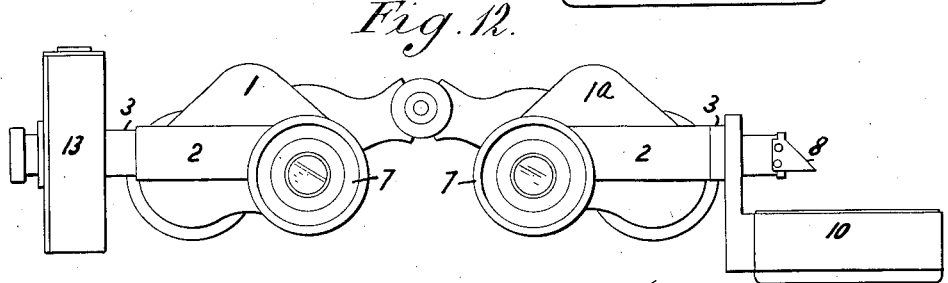

In another arrangement, shown in Figs. 10 and 11, the portion of the periscopic arrangement within the optical viewing instrument, which may conveniently be a binocular as shown, or a monocular, may be constituted by a stationary prism 5ª arranged at or about the dead spot located within the tubular member 1ª of the instrument between the object glass 1ᵇ of the instrument and the rear prism 24 used to receive an image of a distant object as seen through the said object glass and reflect it through a suitable prismatic arrangement, such as is used in a binocular or monocular, on to the image plane of the instrument. The reflecting surface of the said periscopic prism 5ª is arranged opposite the passage in a rotary tubular support 3 such as hereinbefore described, mounted to rotate about a horizontal axis in a tubular bearing 2 with focussing lens arrangement 4, in the side of the said tubular member 1ª of the instrument, and with which is associated a compass box or clinometer, and also a prism arrangement forming the external portion of the periscope arrangement, as hereinbefore described, so that an image or images indicating the magnetic bearing, or the elevation or depression of a distant object, will be reflected through the tubular support on to the periscope prism 5ª and thence be reflected on to a portion of the said rear reflecting prism 24 of the instrument and then through the remaining reflecting prisms of the instrument on to the image plane of the instrument simultaneously with the image of the object as seen through the object glass b. By arranging the inner prism 5ª as described, no image or distinct image thereof, or of its holder, or of the segment of a compass card, or clinometer will be seen on the image plane of the instrument, but only an image of degree indications of the compass card, or clinometer, so that the whole of the image of a distant object, as seen through the object glass of the instrument, will be seen on the image plane, part of said image extending, it may be, through the image of the degrees on that part of the image plane that would otherwise bear an image of the segment of the compass card, or of the clinometer, thus facilitating accurate reading of the magnetic bearing, or the elevation or depression of the distant object. With this arrangement of the inner prism 5ª it will be advantageous to associate with the object glass 1ᵇ means, as for example, an ordinary adjustable iris diagram, to reduce the amount of light transmitted through the object glass to the image plane, in order to prevent it adversely affecting the clearness of the image of the degrees on the compass card, or clinometer.

In the case of a binocular, one of the tubular members thereof say 1ª, may, as shown in Fig. 12, be provided with the inner portion of the periscope arrangement with focussing means and with a rotary support provided with the external portion of the periscope arrangement and carrying a compass box 10, as hereinbefore described, and the other tubular member, say 1, of the instrument, be provided with another inner portion of a periscope arrangement with focussing arrangement and with a rotary tubular support provided with the external portion of the periscope arrangement and with which is associated a clinometer box with associated parts, as shown at 13.

By making the rotary tubular support 3 with associated parts removable from its bearing 2, it can be stored separately from the viewing instrument when not required for use. For a like purpose, the compass box, or clinometer box with associated parts may be made readily removable from the rotary tubular support.

What I claim is:—

1. An optical viewing instrument of the kind herein referred to having a front object glass, a rear magnifying eye piece with image plane and a periscope, characterized thereby that said periscope comprises a prismatic arrangement located within the instrument, a hollow bearing carried by said instrument, a rotary tubular support carried by said bearing and arranged with its axis horizontal and at right angles to the length of the instrument and adapted to carry a device an image of a portion of which it is desired to transmit through the periscope to the image plane of the instrument, a prismatic arrangement mounted on said tubular support outside said instrument and adapted to reflect an image of a portion of said device through said tubular support to the prismatic arrangement within the instrument, and a focussing lens arrangement arranged between the inner and outer prismatic arrangements of the periscope, the inner and outer prismatic arrangements comprising prisms which, with the focussing arrangement are arranged in line with one another in a direction at right angles to the axis of the instrument.

2. An optical viewing instrument according to claim 1, wherein the hollow bearing and tubular support of the periscope are arranged with their common axis in a horizontal plane spaced vertically at a distance from the horizontal plane containing the axis of said eye piece.

3. An optical viewing instrument according to claim 1, wherein the prismatic arrangement of the periscope within the instrument comprises a prism having its inclined reflecting surface arranged opposite a portion of the image plane of the eye piece and of the passage through the tubular bearing and tubular support and the prismatic arrangement outside the instrument comprises a prism having its inclined reflecting surface arranged opposite the reflecting surface of the prism within the instrument.

4. An optical viewing instrument according to claim 1, wherein the hollow horizontal bearing carrying the tubular support and focussing arrangement is mounted on the rear end of the body of the instrument and in a vertical plane in front of the image plane and eye piece of the instrument.

5. An optical viewing instrument of the binocular or monocular telescope type, comprising a body portion having two adjacent longitudinal members one of which is provided at its front end with an object glass and at its rear end with a reflecting prism and the other member is provided with a prismatic arrangement adapted to receive a focussed image of a distant object as seen through said object glass and reflected from the said rear prism and transmit it to the image plane and eye piece of the instrument and a periscope comprising a reflecting prism arranged within one of said members between the said object glass and rear prism thereof and at the dead spot between them, a horizontal tubular bearing carried by the wall of said member and arranged at right angles thereto and opposite to said internal prism, a focussing lens arrangement within said bearing, a tubular support carried by said bearing and a reflecting prism carried by said tubular support and arranged outside said member and adapted to receive an image of data from an external device and reflect such image through such tubular support, bearing, and focussing lens arrangement direct on to the reflecting surface of the first mentioned prism which is arranged to reflect said image direct on to the said rear reflecting prism in said member.

6. The combination with a viewing instrument of the kind herein referred to having a front object glass, and a rear magnifying eye piece with image plane, of a periscope carried by said instrument and comprising a prismatic arrangement located within said instrument and adapted to reflect a focussed image received by it to said image plane and eye piece, a hollow bearing fixed to said instrument, a tubular support carried by said bearing and arranged to rotate about a horizontal axis at right angles to the length of said instrument, a prism carried by the outer end portion of said tubular support external to the instrument and arranged to receive light rays from below and reflect them through said support and bearing to said inner prismatic arrangement arranged in line with and a focussing lens arrangement between a prism of said inner prismatic arrangement and the external prism, and a magnetic compass the box of which is fixed to said rotary support, and a segment of the graduated movable compass card of which is arranged below the external prism and is horizontal when the instrument is held horizontally or be turned into a horizontal position when the instrument is turned in a vertical plane about a horizontal axis.

7. A combined viewing instrument, periscope and magnetic compass according to claim 6, wherein the prismatic arrangement of the periscope within the instrument consists of a single prism adapted to receive and directly reflect a focussed image of the degrees and markings on the segment of the compass card below the external prism of the periscope on to the image plane of the eye piece so that it will extend transversely across the said image plane and be spaced vertically from the centre of said image plane.

8. The combination with a viewing instrument of the kind herein referred to having a front object glass and a rear magnifying eye piece with image plane, of a periscope carried by said instrument and comprising a prismatic arrangement located within said instrument and adapted to reflect a focussed image received by it to said image plane and eye piece, a hollow bearing fixed to said instrument, a tubular support carried by and movable with said bearing and arranged with its axis horizontal and at right angles to the length of said instrument, a prism carried by the outer end portion of said tubular support external to the instrument and arranged to receive light rays from above and reflect them through said support and bearing to said inner prismatic arrangement and a focussing lens arrangement between said inner prismatic arrangement and said outer prism, and a clinometer arrangement carried by said tubular support and comprising stationary arc-shaped scales extending in opposite directions from a mid-zero indication and representing respectively angles of elevation and depression, and an index or pointer movable with said tubular support and arranged transversely of and near to said scales and opposite said zero indicator when the instrument is held horizontally, said scales and index or pointer being arranged so that images thereof will be formed on said prism and be reflected thereby through said support, bearing and focussing lens arrangement direct to a prism of the prismatic arrangement within the instrument arranged in front of the image plane of the instrument.

9. A combined viewing instrument, periscope and clinometer according to claim 8, wherein the stationary scales are formed on an arc shaped segment of transparent material carried by the upper portion of a pendulum device pivoted horizontally in a box of opaque material fixed to the tubular support and provided at the top with a window above the said segment, and the index or pointer comprises a wire carried by the said box and extending across said segment and arranged below said window.

10. A combined viewing instrument periscope and clinometer according to claim 8, wherein the stationary scales are formed on an arc-shaped segment of transparent material carried by the upper portion of a pendulum device pivoted on an external portion of the tubular support and the movable index or pointer is constituted by a wire carried by a holder fixed to the said tubular support and arranged opposite a lateral opening in said holder opposite to said scales and index or pointer, and wherein a prism is arranged opposite said scales, index or pointer and opening to reflect images of the scales and index or pointer on to the reflecting surface of the external prism of the periscope arranged opposite the passage in the said tubular support.

11. A combined viewing instrument, periscope and clinometer according to claim 8, wherein the prismatic arrangement of the periscope within the instrument comprises a prism adapted to receive and reflect focussed images of the stationary scales and movable index or pointer of the clinometer arranged above the external prism of the periscope and to reflect such images on to the image plane of the eye piece, the said inner and outer prisms being arranged in a horizontal plane displaced vertical from the horizontal plane containing the axis of the image plane and eye piece so that the image of the scales will extend transversely across the said image plane and be spaced vertically from the centre thereof, with the image of the index or pointer extending vertically across the image of the scales.

12. For use with a viewing instrument of the kind herein described, provided, as hereinbefore set forth, with a focussing arrangement, with a prism adapted to reflect, horizontally, a focussed image of an object received thereby, direct on to the image plane of the instrument, and with a horizontal tubular bearing arranged at right angles to and movable with the instrument, a tubular support adapted to be fitted in a removable manner to said tubular bearing and to rotate about a horizontal axis, a depending carrier fixed to said support, a magnetic compass the box of which is carried by said carrier and a prism mounted on said support outside said instrument and above a segment of the movable compass card within said box and arranged to reflect an image of said segment through said tubular support and focussing arrangement direct on to the first mentioned prism.

13. For use with a viewing instrument of the kind herein described, provided, as hereinbefore set forth, with a focussing arrangement with a prism adapted to reflect, horizontally, a focussed image of an object received thereby, direct on to the image plane of the instrument, and with a horizontal tubular bearing arranged at right angles to and movable with the instrument, a tubular support adapted to be fitted in a removable manner to said tubular bearing, a clinometer carried by said tubular support and comprising oppositely arranged scales, with a zero position between them, representing angles of elevation and depression and carried by a pivoted pendulum member so that said scales will remain stationary at all times when using the instrument, and an index or pointer extending across said scales and movable with said tubular support, and a prismatic arrangement carried by said tubular support external to said instrument and adapted to reflect images of said scales and index or pointer horizontally through said tubular support and focussing arrangement direct on to the first mentioned prism.

HENRY ERNEST LLOYD OWEN.